United States Patent
Tseng et al.

(10) Patent No.: US 12,039,240 B2
(45) Date of Patent: Jul. 16, 2024

(54) INTEGRATED CIRCUIT SIMULATION AND DESIGN METHOD AND SYSTEM THEREOF

(71) Applicant: REALTEK SEMICONDUCTOR CORP., Hsinchu (TW)

(72) Inventors: Hsing-Han Tseng, Hsinchu (TW); Yung-Jen Chen, Hsinchu (TW); Yu-Lan Lo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 171 days.

(21) Appl. No.: 17/517,322

(22) Filed: Nov. 2, 2021

(65) Prior Publication Data
US 2022/0147676 A1    May 12, 2022

(30) Foreign Application Priority Data
Nov. 6, 2020  (TW) .................... 109138942

(51) Int. Cl.
*G06F 30/3312* (2020.01)
*G06F 30/323* (2020.01)
*G06F 30/327* (2020.01)
*G06F 119/12* (2020.01)

(52) U.S. Cl.
CPC ........ *G06F 30/3312* (2020.01); *G06F 30/323* (2020.01); *G06F 30/327* (2020.01); *G06F 2119/12* (2020.01)

(58) Field of Classification Search
CPC .. G06F 30/323; G06F 30/327; G06F 30/3312; G06F 2119/12
See application file for complete search history.

(56) References Cited

U.S. PATENT DOCUMENTS

| 6,324,679 | B1 | 11/2001 | Raghunathan et al. |
| 10,417,362 | B1 | 9/2019 | Neto et al. |
| 11,461,523 | B1* | 10/2022 | Chen ................. G06F 30/3312 |
| 2006/0074622 | A1* | 4/2006 | Scott ................. G06F 11/3692 |
| | | | 703/23 |

* cited by examiner

*Primary Examiner* — Jack Chiang
*Assistant Examiner* — Aric Lin
(74) *Attorney, Agent, or Firm* — Birch, Stewart, Kolasch & Birch, LLP

(57) ABSTRACT

An integrated circuit simulation method is performed by a processor and includes: obtaining a register transfer level (RTL) waveform set obtained by performing an RTL simulation based on a circuit, where the circuit is generated in an RTL design stage and includes a register having an internal net and a data output port, and the RTL waveform set includes a first waveform corresponding to the data output port of the register; obtaining a netlist and delay information obtained by performing a logic synthesis based on the circuit, where the netlist includes a first node and a second node, the first node corresponds to the internal net of the register, and the second node corresponds to the data output port of the register; applying the first waveform to the first node; and triggering the register according to the delay information to obtain a second waveform at the second node.

20 Claims, 6 Drawing Sheets

INTEGRATED CIRCUIT SIMULATION AND DESIGN METHOD AND SYSTEM THEREOF

CROSS-REFERENCE TO RELATED APPLICATION

This non-provisional application claims priority under 35 U.S.C. § 119(a) to Patent Application No. 109138942 filed in Taiwan, R.O.C. on Nov. 6, 2020, the entire contents of which are hereby incorporated by reference.

BACKGROUND

Technical Field

The present invention relates to an integrated circuit simulation technology, and in particular, to an integrated circuit simulation and design method and system thereof for generating a reliable simulation waveform in an initial stage of an integrated circuit design.

Related Art

A general integrated circuit design mainly includes an early stage and a later stage. The early stage includes a register transfer level (RTL) design, a functional simulation, and a logic synthesis. The later stage includes a physical design, a place and route, and a post layout simulation.

As the complexity and scale of integrated circuit designs gradually increase, a reliable simulation waveform usually can be obtained only in a post layout simulation stage. The simulation waveform has accurate timing delay information for a power analysis, to ensure that the power consumption and operation of an integrated circuit are correct. To perform a power analysis in an early stage of an integrated circuit design, if a reliable simulation waveform cannot be obtained, it is difficult to obtain an accurate analysis result. However, during the post layout simulation, it usually takes a lot of time to correct simulation errors caused by timing violations. In addition, if a simulation waveform of a post layout simulation is used for the power analysis, the time at which a power analysis report is completed is quite close to the time of tape-out and production or even the power analysis report is obtained only after the tape-out and production. It is difficult for designers to correct the integrated circuit design for power consumption problems.

SUMMARY

In view of the above, the present invention provides an integrated circuit simulation and design method and system thereof, to obtain an accurate result of post layout simulation in an early stage of an integrated circuit design equivalent to that in a later stage of the design.

According to some embodiments, the integrated circuit simulation method is performed by a processor, the integrated circuit simulation method including: obtaining an RTL waveform set obtained by performing an RTL simulation based on a circuit, where the circuit is generated in an RTL design stage and includes a register having an internal net and a data output port, and the RTL waveform set includes a first waveform corresponding to the data output port of the register; obtaining a netlist and delay information obtained by performing a logic synthesis based on the circuit, where the netlist includes a first node and a second node, the first node corresponds to the internal net of the register, and the second node corresponds to the data output port of the register; applying the first waveform to the first node; and triggering the register according to the delay information to obtain a second waveform at the second node.

According to some embodiments, the integrated circuit design method is performed by a processor, the integrated circuit design method including: obtaining a circuit generated based on an RTL design stage, where the circuit includes a register having an internal net and a data output port; performing an RTL simulation based on the circuit to obtain an RTL waveform set, where the RTL waveform set includes a first waveform corresponding to the data output port of the register; performing a logic synthesis based on the circuit to obtain a netlist and delay information, where the netlist includes a first node and a second node, the first node corresponds to the internal net of the register, and the second node corresponds to the data output port of the register; applying the first waveform to the first node; triggering the register according to the delay information to obtain a second waveform at the second node; and performing an analysis based on the second waveform.

According to some embodiments, the integrated circuit simulation system includes a non-transitory storage medium and a processor. The processor is coupled to the non-transitory storage medium. The non-transitory storage medium is configured to store a program. The processor is configured to load the program to perform the following steps: obtaining an RTL waveform set obtained by performing an RTL simulation based on a circuit, where the circuit is generated in an RTL design stage and includes a register having an internal net and a data output port, and the RTL waveform set includes a first waveform corresponding to the data output port of the register; obtaining a netlist and delay information obtained by performing a logic synthesis based on the circuit, where the netlist includes a first node and a second node, the first node corresponds to the internal net of the register, and the second node corresponds to the data output port of the register; applying the first waveform to the first node; and triggering the register according to the delay information to obtain a second waveform at the second node.

In summary, according to the embodiments of the present invention, waveform simulation may be performed as long as an initial-version netlist (without a netlist generated after a place and route stage) in an early stage of the design is obtained, to obtain an accurate result of a post layout simulation equivalent to that in a later stage of the design, and a design problem can be found and mitigated in advance during an integrated circuit design, thereby shortening the schedule of the integrated circuit design.

DETAILED DESCRIPTION

Some words are used to refer to specific elements in this specification. A person of ordinary skill in the art should understand that, a hardware manufacturer may refer to a same element by using different terms. A difference in function of an element should be used as a standard for distinguishing between elements, and a difference in name should not be used as a way of distinguishing between elements. The term "coupled" mentioned in this specification includes any direct and indirect electrical connection means. Therefore, if a first apparatus is coupled to a second apparatus as described in this specification, it represents that the first apparatus may be directly electrically connected to the second apparatus, or may be indirectly electrically connected to the second apparatus by using other apparatuses or connection means.

Figure 1:
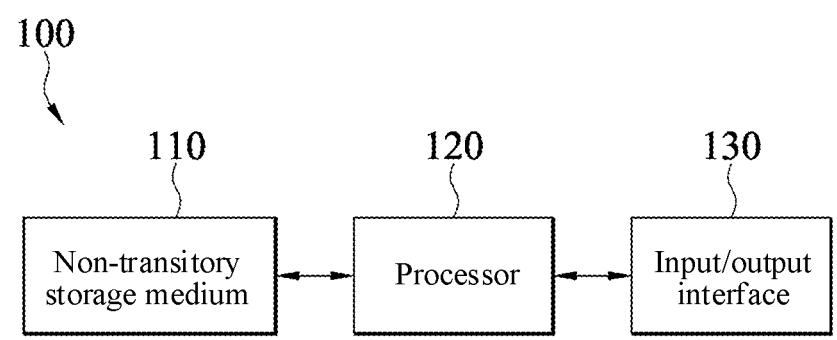
FIG. 1 is a schematic block diagram of an integrated circuit simulation system according to an embodiment of the present invention.

FIG. 1 is a schematic block diagram of an integrated circuit simulation system 100 according to an embodiment of the present invention. The integrated circuit simulation system 100 includes a non-transitory storage medium 110, a processor 120, and an input/output interface 130. The processor 120 is coupled to the non-transitory storage medium 110 and the input/output interface 130. The non-transitory storage medium 110 stores a program for the processor 120 after being loaded to perform the integrated circuit simulation and design method of the present invention, to simulate a circuit design. The circuit may be, for example, a digital circuit or a hybrid circuit including a digital circuit and an analog circuit. Generally, the digital circuit mainly includes a register and a logic circuit between registers. The register is configured to provide a memory function, and through a clock rate, trigger to synchronize a sequential operation. The logic circuit provides a logic computing function.

Figure 2:
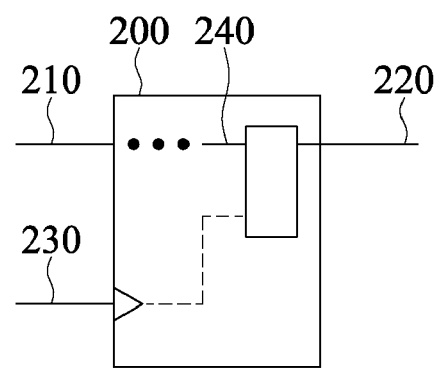
FIG. 2 is a partial schematic diagram of a circuit according to an embodiment of the present invention.

FIG. 2 is a partial schematic diagram of a circuit according to an embodiment of the present invention. The register 200 may include one or more flip-flops. Herein, a D-type flip-flop is used as an example. The register 200 includes at least one data input port 210, at least one data output port 220, a clock input port 230, and an internal net 240. The internal net 240 is located inside the register 200 and is located between the data input port 210 and the data output port 220. The data input port 210 is configured to receive a data input signal. The data output port 220 is configured to output a data output signal. The clock input port 230 is configured to: receive a clock signal, to enable the register 200 to perform triggering according to the clock signal (for example, positive-edge triggering or negative-edge triggering), and output a data output signal according to the data input signal.

Figure 3:
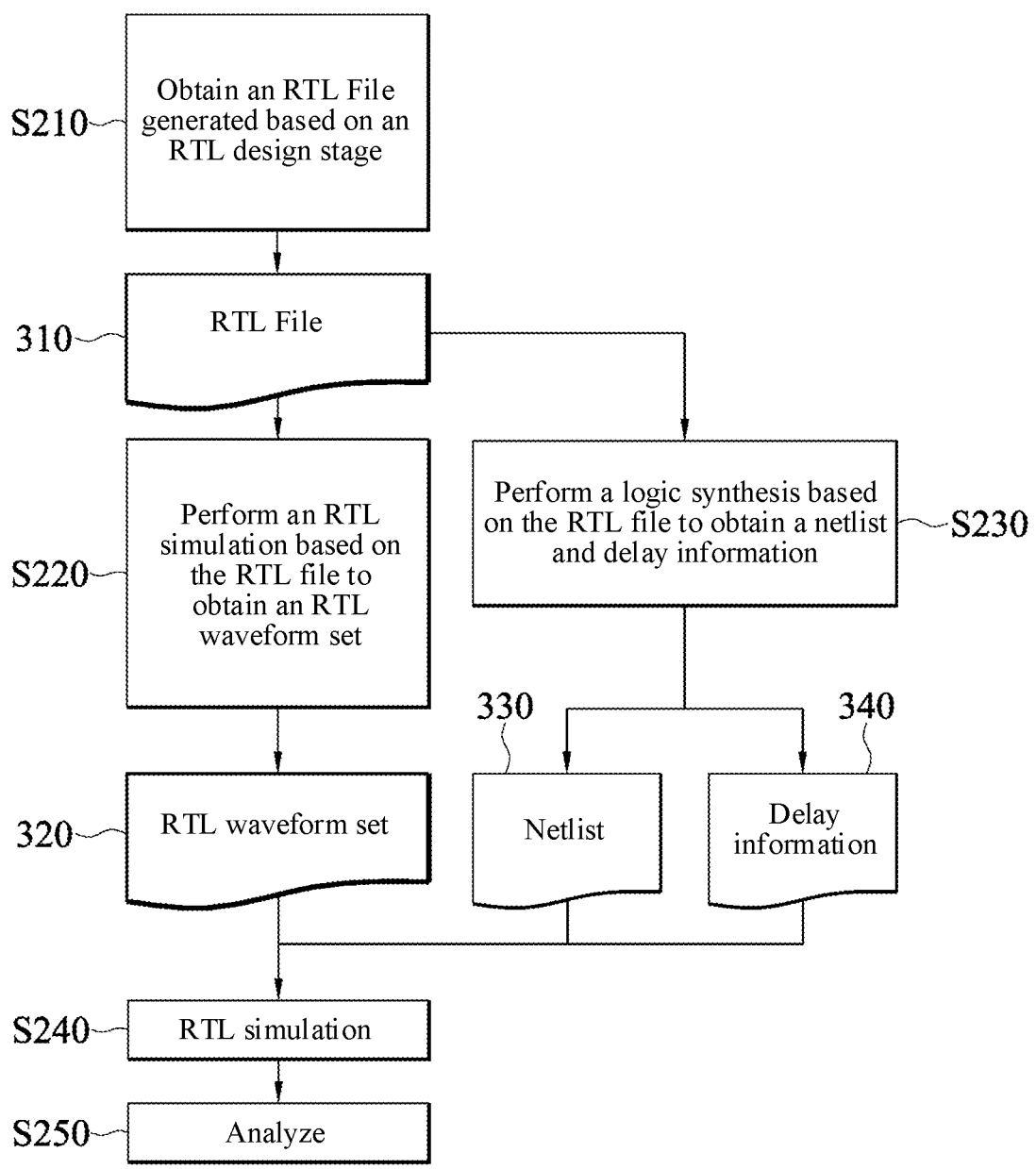
FIG. 3 is a flowchart of an integrated circuit design method according to an embodiment of the present invention.

FIG. 3 is a flowchart of an integrated circuit design method according to an embodiment of the present invention. First, an RTL File 310 generated based on an RTL design stage is obtained (step S210). Herein, the RTL file 310 is a hardware description program file and includes a hardware description of the foregoing circuit. The hardware description program file is written in code, for example, but not limited to, very high-speed hardware description language (VHDL) and Verilog.

Next, an RTL simulation is performed based on the RTL file 310 to obtain an RTL waveform set 320 (step S220). The RTL waveform set 320 is generally presented as a timing waveform. The RTL simulation is also referred to as a functional simulation or a behavioral simulation and may quickly verify whether a circuit function or timing meets an expectation without considering factors such as a cell delay, a clock delay, and a wire delay.

On the other hand, in step S230, a logic synthesis is performed based on the RTL file 310 to obtain a netlist 330 and delay information 340. The logic synthesis may map the RTL file 310 to a logical gate level netlist 330. Specifically, a corresponding connecting line between a logic function and a logic gate is established for a circuit behavior of the circuit described by the RTL file 310, and a simplified netlist 330 is further generated. In the process of the logic synthesis, reference is made to a standard cell library. The standard cell library includes cell schematics of various standard cells (for example, various logic gates, various flip-flops, and various latches) and timing models. The cell schematics are used for a circuit synthesis to generate the netlist 330. The timing model describes timing models of various standard cells such as a gate delay, an input delay, an output delay, and a wire delay, which may be used to generate the delay information 340.

After obtaining the RTL waveform set 320, the netlist 330, and the delay information 340, the process may enter step S240 to perform the integrated circuit simulation method of the present invention. The integrated circuit simulation method is described below in detail. It should be noted herein that after being obtained in step S240, the simulation result may be used for performing a required analysis (step S250). The analysis may be, for example, a power analysis, to obtain a power analysis report. From the power analysis report, a sink state in the circuit may be determined, an effective power may be analyzed, an IR drop may be analyzed, and so on. Therefore, according to the analysis result, a designer may subsequently further determine whether the circuit design needs to be adjusted.

In some embodiments, the delay information 340 is in the standard delay format (SDF).

Figure 4:
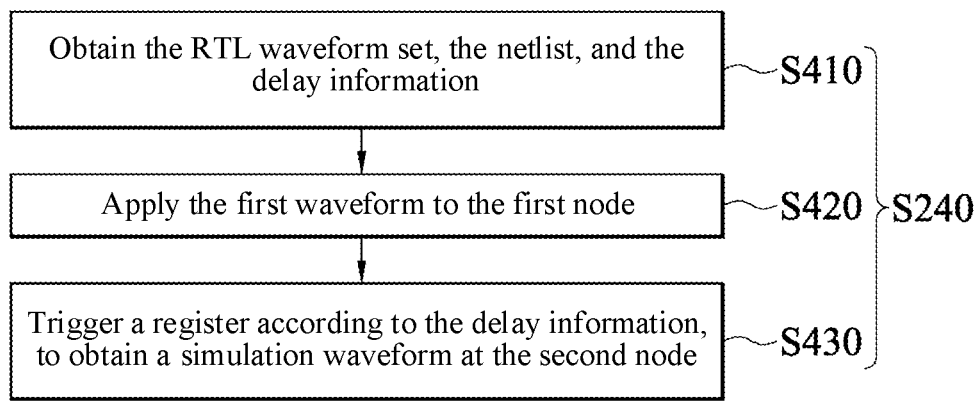
FIG. 4 is a flowchart of an integrated circuit simulation method according to an embodiment of the present invention.
Figure 5:
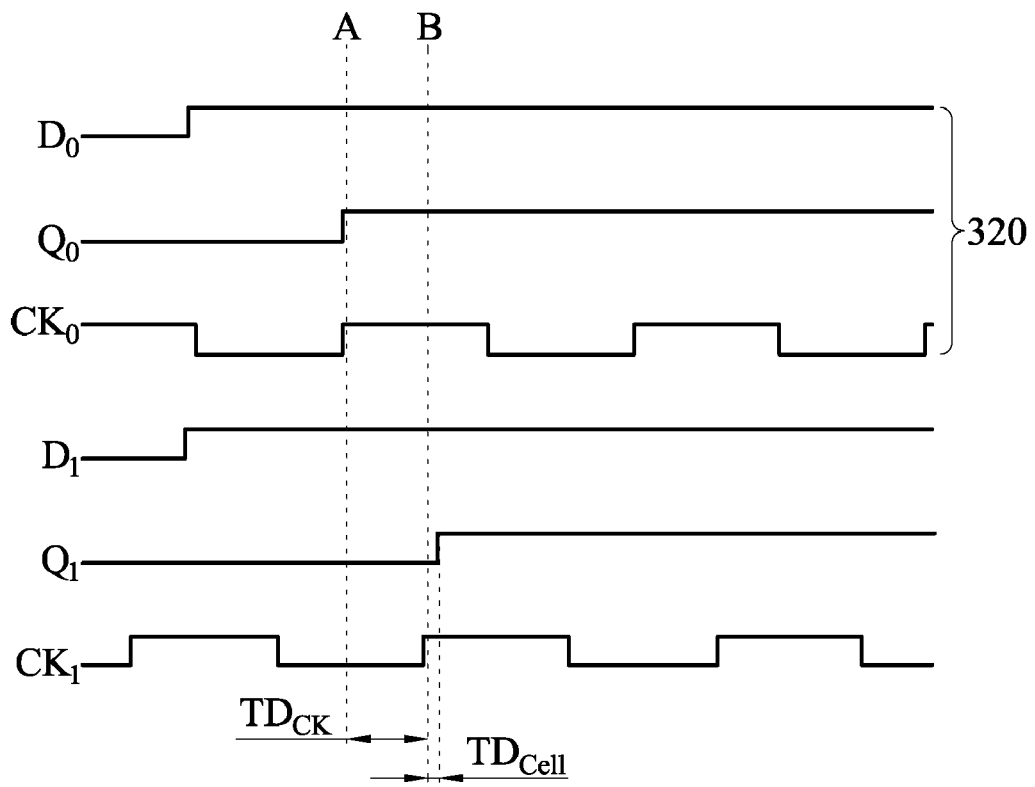
FIG. 5 is a schematic waveform diagram according to an embodiment of the present invention.

FIG. 4 is a flowchart of an integrated circuit simulation method according to an embodiment of the present invention. Refer to FIG. 4 and FIG. 5 together. After the foregoing step S220 and step S230, the RTL waveform set 320, the netlist 330, and the delay information 340 may be obtained (step S410).

FIG. 5 is a schematic waveform diagram according to an embodiment of the present invention. The RTL waveform set 320 includes waveforms $D_0$ and $D_1$ corresponding to the data input port 210 of the register 200, a waveform (hereinafter referred to as a first waveform $Q_0$) corresponding to the data output port 220 of the register 200, and a clock signal $CK_0$ inputted into the register 200. As shown in FIG. 5, in this embodiment, the register 200 is positive-edge triggered. When the clock signal $CK_0$ is switched from a low state to a high state (hereinafter referred to as a trigger time point A), the data output port 220 outputs a value received at the data input port 210, so that the first waveform $Q_0$ is switched from the low state to the high state at the trigger time point A.

The netlist 330 includes a first node and a second node. The first node corresponds to the internal net 240 of the register 200, and the second node corresponds to the data output port 220 of the register. Specifically, the first node is a port point of a logic gate forming the register 200. The delay information 340 includes a clock delay amount $TD_{CK}$ of the clock signal $CK_0$.

In step S420, the first waveform $Q_0$ is applied to the first node.

In step S430, the register 200 is triggered according to the delay information 340, to obtain a simulation waveform (hereinafter referred to as a second waveform $Q_1$) at the second node (the data output port 220 corresponding to the register 200). Specifically, as shown in FIG. 5, the delay information 340 includes the clock delay amount $TD_{CK}$ of the clock signal $CK_0$. Therefore, a clock signal $CK_1$ delayed by the clock delay amount $TD_{CK}$ may be obtained, and the register 200 is triggered according to the clock signal $CK_1$ having the clock delay amount $TD_{CK}$. That is, compared with the trigger time point A, a trigger time point B at which the clock signal $CK_1$ is switched from the low state to the high state has the clock delay amount $TD_{CK}$. The register 200 is triggered at the trigger time point B, to output (the first waveform $Q_0$) the value applied to the first node. In addition, a transfer time between the logic gate and a wire still needs to be consumed between the first node and the second node. Therefore, compared with the first waveform $Q_0$, the second waveform $Q_1$ further includes a cell delay amount $TD_{Cell}$ of the register 200 in addition to the clock delay amount $TD_{CK}$.

Figure 6:
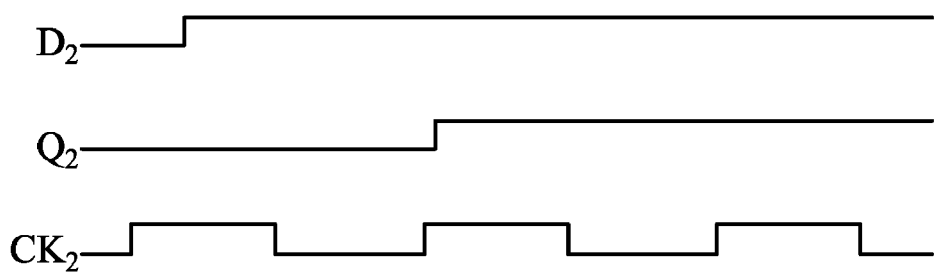
FIG. 6 is a schematic waveform diagram of a first comparative example.

FIG. 6 is a schematic waveform diagram of a first comparative example. The waveforms $D_2$, $Q_2$ and $CK_2$ are simulation waveforms corresponding to the data input port 210, the data output port 220, and the clock input port 230 of the register 200 in the first comparative example respectively. In the first comparative example, the post layout simulation is used for generating the simulation waveforms. Referring to FIG. 5 and FIG. 6, it may be learned that the simulation result according to the procedure in FIG. 4 is the same as or quite close to the simulation result using the post layout simulation. The reason is that the delay information used in the procedure in FIG. 4 is the same as the delay information 340 in the post layout simulation.

Figure 7:
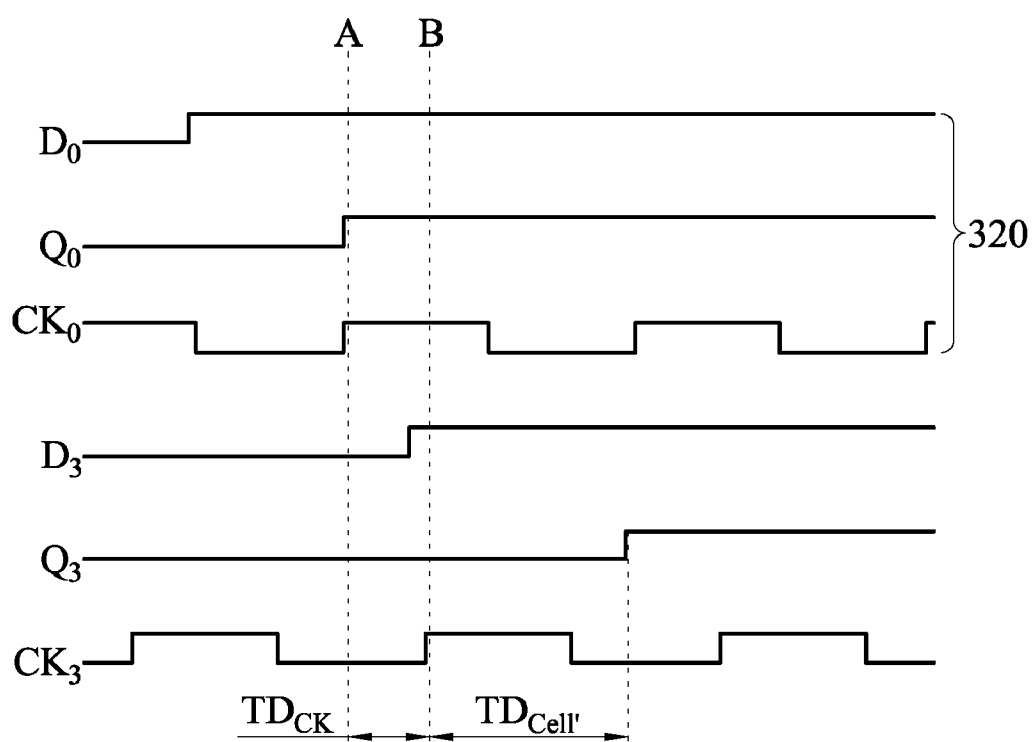
FIG. 7 is a schematic waveform diagram of a second comparative example.

FIG. 7 is a schematic waveform diagram of a second comparative example. The waveforms $D_3$, $Q_3$ and $CK_3$ are simulation waveforms corresponding to the data input port 210, the data output port 220, and the clock input port 230 of the register 200 in the second comparative example respectively. In the second comparative example, the foregoing first waveform $Q_0$ is applied to the data output port 220 of the register 200. However, because the first waveform $Q_0$ is applied to the data output port 220 of the register 200, the designer needs to input cell delay parameters of the register 200 before the first waveform $Q_0$ can be applied to the data output port 220 of the register 200 at a correct time point, to obtain a correct waveform. Herein, in the second comparative example, the clock delay amount $TD_{CK}$ and a cell delay amount $TD_{Cell'}$ are obtained through static timing analysis (STA). The registers 200 in a general integrated circuit are all affected by a plurality of delay parameters. Because the STA can support only one delay operation of the clock delay amount $TD_{CK}$ and the cell delay parameters for the data output port 220 of a single register 200, the delay information 340 (for example, in the SDF) can support a plurality of delay operations of the clock delay amount $TD_{CK}$ and the cell delay parameters according to the state of the register 200, thereby making the waveform $Q_3$ different from the simulation result (the second waveform $Q_1$ shown in FIG. 5) of the procedure in FIG. 4. As a comparison, in the procedure in FIG. 4 according to the embodiments of the present invention, because the first waveform $Q_0$ is applied to the first node (corresponding to the internal net 240 of the register 200) without additionally obtaining the cell delay parameters of the register 200, the accurate simulation result may be obtained.

Figure 8:
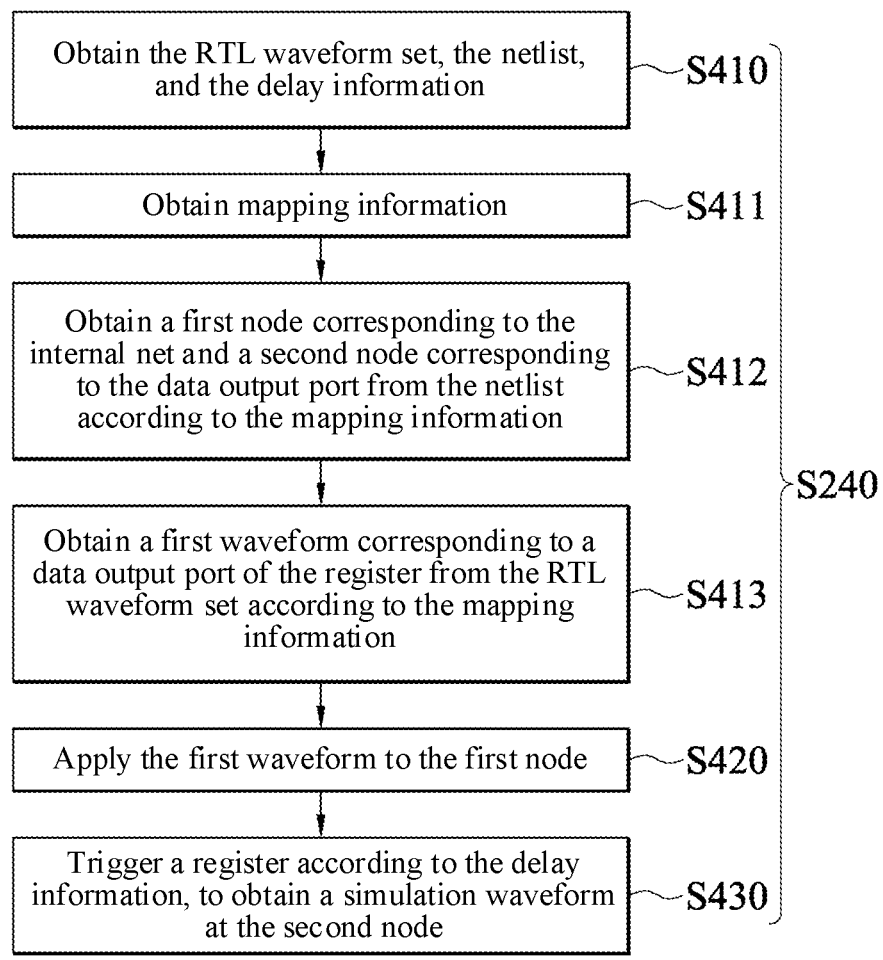
FIG. 8 is a flowchart of an integrated circuit simulation method according to an embodiment of the present invention.

FIG. 8 is a flowchart of an integrated circuit simulation method according to an embodiment of the present invention. Compared with FIG. 4, steps S411 to S413 are further performed between the foregoing step S410 and step S420.

In step S411, mapping information is first obtained. The mapping information has a mapping relationship between the RTL file 310 and the netlist 330, and the positions at which standard elements that are described in the RTL file 310 and are mapped to the logic gate in the netlist 330 may be learned. The mapping information may be obtained through logical equivalence checking.

In step S412, according to the mapping relationship described in the mapping information, the first node corresponding to the internal net 240 is obtained from the netlist 330 for subsequent execution of step S420. The second node corresponding to the data output port 220 is obtained from the netlist 330 for subsequent execution of steps S413 and S430.

In step S413, the second node corresponding to the data output port 220 may be obtained according to the mapping relationship described in the mapping information, and therefore the first waveform $Q_0$ corresponding to the second node (the data output port 220 of the register 200) may be obtained from the RTL waveform set 320. Sequentially, the foregoing steps S420 and step S430 may be continuously performed.

In some embodiments, the non-transitory storage medium 110 is, for example, but not limited to, a conventional hard disk, a solid state hard disk, a flash memory or an optical disk. The processor 120 is, for example, but not limited to, an operation circuit such as a central processing unit (CPU), a microprocessor, an application-specific integrated circuit (ASIC) or a system on a chip (SOC). The input/output interface 130 may be provided for connecting a control apparatus (for example, a keyboard or a mouse). The control apparatus is operated by the designer to generate an operation instruction. The operation instruction is transferred to the processor 120 through the input/output interface 130, so that the processor 120 performs a corresponding operation in response to the operation instruction. Herein, although one non-transitory storage medium 110, one processor 120, and one input/output interface 130 are used as an example, the present invention is not limited thereto. In some cases, for at least one of the non-transitory storage medium 110, the processor 120, and the input/output interface 130, there may be a plurality of non-transitory storage media, processors and/or input/output interfaces.

In summary, according to the embodiments of the present invention, waveform simulation may be performed as long as an initial-version netlist (without a netlist generated after a place and route stage) in an early stage of the design is obtained, to obtain an accurate result of a post layout simulation equivalent to that in a later stage of the design, and a design problem can be found and mitigated in advance during an integrated circuit design, thereby shortening the schedule of the integrated circuit design.

What is claimed is:

1. An integrated circuit simulation method, performed by a processor, the integrated circuit simulation method comprising:

obtaining a register transfer level (RTL) waveform set obtained by performing an RTL simulation based on a circuit, wherein the circuit is generated in an RTL design stage and comprises a register having a data input port, an internal net and a data output port, and the RTL waveform set comprises a first waveform corresponding to the data output port of the register, wherein the internal net is located inside the register and is located between the data input port and the data output port;
obtaining a netlist and delay information obtained by performing a logic synthesis based on the circuit, wherein the netlist comprises a first node and a second node, the first node corresponds to the internal net of the register, and the second node corresponds to the data output port of the register;
applying the first waveform to the first node; and
triggering the register according to the delay information to obtain a second waveform at the second node.

2. The integrated circuit simulation method according to claim 1, wherein compared with the first waveform, the second waveform has a cell delay amount of the register and a clock delay amount of a clock signal inputted into the register.

3. The integrated circuit simulation method according to claim 1, wherein the delay information comprises a clock delay amount of a clock signal inputted into the register.

4. The integrated circuit simulation method according to claim 3, wherein the step of triggering the register according to the delay information is triggering the register according to the clock signal having the clock delay amount.

5. The integrated circuit simulation method according to claim 1, wherein the delay information is in the standard delay format (SDF).

6. The integrated circuit simulation method according to claim 1, further comprising:
obtaining mapping information; and
obtaining the first node corresponding to the internal net and the second node corresponding to the data output port in the netlist according to the mapping information.

7. The integrated circuit simulation method according to claim 6, further comprising:
obtaining the first waveform corresponding to the data output port of the register according to the mapping information from the RTL waveform set.

8. An integrated circuit design method, performed by a processor, the integrated circuit design method comprising:
obtaining a circuit generated based on a register transfer level (RTL) design stage, wherein the circuit comprises a register having a data input port, an internal net and a data output port wherein the internal net is located inside the register and is located between the data input port and the data output port;
performing an RTL simulation based on the circuit to obtain an RTL waveform set, wherein the RTL waveform set comprises a first waveform corresponding to the data output port of the register;
performing a logic synthesis based on the circuit to obtain a netlist and delay information, wherein the netlist comprises a first node and a second node, the first node corresponds to the internal net of the register, and the second node corresponds to the data output port of the register;
applying the first waveform to the first node;
triggering the register according to the delay information to obtain a second waveform at the second node; and
performing an analysis based on the second waveform.

9. The integrated circuit design method according to claim 8, wherein the analysis is a power analysis.

10. The integrated circuit design method according to claim 8, wherein the delay information comprises a clock delay amount of a clock signal inputted into the register.

11. The integrated circuit design method according to claim 10, wherein the step of triggering the register according to the delay information is triggering the register according to the clock signal having the clock delay amount.

12. The integrated circuit design method according to claim 8, wherein the delay information is in the standard delay format (SDF).

13. The integrated circuit design method according to claim 8, further comprising:
obtaining mapping information; and
obtaining the first node corresponding to the internal net and the second node corresponding to the data output port in the netlist according to the mapping information.

14. The integrated circuit design method according to claim 13, further comprising:
obtaining the first waveform corresponding to the data output port of the register according to the mapping information from the RTL waveform set.

15. An integrated circuit simulation system, comprising:
a non-transitory storage medium, configured to store a program; and
a processor, coupled to the non-transitory storage medium, and configured to load the program to perform the following steps:
obtaining a register transfer level (RTL) waveform set obtained by performing an RTL simulation based on a circuit, wherein the circuit is generated in an RTL design stage and comprises a register having a data input port, an internal net and a data output port, and the RTL waveform set comprises a first waveform corresponding to the data output port of the register, wherein the internal net is located inside the register and is located between the data input port and the data output port;
obtaining a netlist and delay information obtained by performing a logic synthesis based on the circuit, wherein the netlist comprises a first node and a second node, the first node corresponds to the internal net of the register, and the second node corresponds to the data output port of the register;
applying the first waveform to the first node; and
triggering the register according to the delay information to obtain a second waveform at the second node.

16. The integrated circuit simulation system according to claim 15, wherein compared with the first waveform, the second waveform has a cell delay amount of the register and a clock delay amount of a clock signal inputted into the register.

17. The integrated circuit simulation system according to claim 15, wherein the delay information comprises a clock delay amount of a clock signal inputted into the register.

18. The integrated circuit simulation system according to claim 17, wherein the step of triggering the register according to the delay information is triggering the register according to the clock signal having the clock delay amount.

19. The integrated circuit simulation system according to claim 15, wherein the delay information is in the standard delay format (SDF).

20. The integrated circuit simulation system according to claim 15, wherein the steps performed by loading the program into the processor further comprise:
obtaining mapping information;
obtaining the first node corresponding to the internal net and the second node corresponding to the data output port in the netlist according to the mapping information; and obtaining the first waveform corresponding to the data output port of the register according to the mapping information from the RTL waveform set.

\* \* \* \* \*